June 7, 1955 R. N. JUNGLES 2,710,085
TWO-DIRECTIONAL CLUTCH
Filed May 12, 1954 4 Sheets-Sheet 1

INVENTOR.
ROBERT N. JUNGLES
BY
ATTORNEY

INVENTOR.
ROBERT N. JUNGLES
BY
ATTORNEY

June 7, 1955  R. N. JUNGLES  2,710,085
TWO-DIRECTIONAL CLUTCH

Filed May 12, 1954  4 Sheets-Sheet 4

INVENTOR.
ROBERT N. JUNGLES
BY
ATTORNEY

United States Patent Office 2,710,085
Patented June 7, 1955

2,710,085

TWO-DIRECTIONAL CLUTCH

Robert N. Jungles, Parma, Ohio, assignor to The Cleveland Pneumatic Tool Company, Cleveland, Ohio, a corporation of Ohio Application May 12, 1954, Serial No. 429,221

7 Claims. (Cl. 192—7)

This invention relates broadly to a two-directional clutch mechanism, but more particularly to such mechanisms used in conjunction with ball screw and nut constructions for automatically preventing backing up of the screw or nut elements by forces other than those imparted thereto by a power source to perform the work.

In the usual ball screw and nut construction, that is wherein the screw and nut elements are operatively interconnected by a series of balls for transmitting force from one element to the other, when the power, such as an electric motor or the like, is turned off, it is not unusual for the load carried by the driven element to develop sufficient torque to overcome the inertia of the motor and effect rotation of the driving element in one or the other direction depending upon the direction in which such load is applied, thereby causing uncontrolled axial motion of the driven or load carrying element. In some other instances, especially when the unit is used under tension, it is possible for the load carried by the driven element to become an aiding load tending to rotate the driving element at an uncontrolled speed greater than that of the motor to which it is connected.

It is therefore an object of this invention to provide operatively associated screw and nut elements with a simple and positive no-back device automatically preventing motion of the driven element in a direction opposite to that of its normal driven motion.

Another object of this invention is to provide motor operated screw and nut cooperating elements with simple and efficient means automatically preventing motion of the load carrying element in the same direction as, but at a greater speed than, that of its normal driven motion.

Another object of this invention is to produce such a no-back device for a screw and nut assembly wherein in the case of the nut being driven by a powered screw, the no-back device will automatically become effective upon initial backing up motion of the screw.

Another object of this invention is to produce such no-back device for a screw and nut assembly which is equally effective for preventing accidental rotation in either direction of the screw by forces other than those imparted thereto by power means with which the screw is operatively associated.

Another object of this invention is to produce such a no-back device through which the driving and driven elements remain locked against relative movement once the device becomes effective, but are automatically released upon normal driving motion of the driving element by the power source to which it is connected.

These objects are accomplished by a construction free of complication and by arrangement of parts resulting in a compact unit which is strong, durable and efficient.

In the accompanying drawings, Figure 1 is an enlarged side elevational view, partly in section, of a clutch mechanism embodying the invention.

Figure 1:
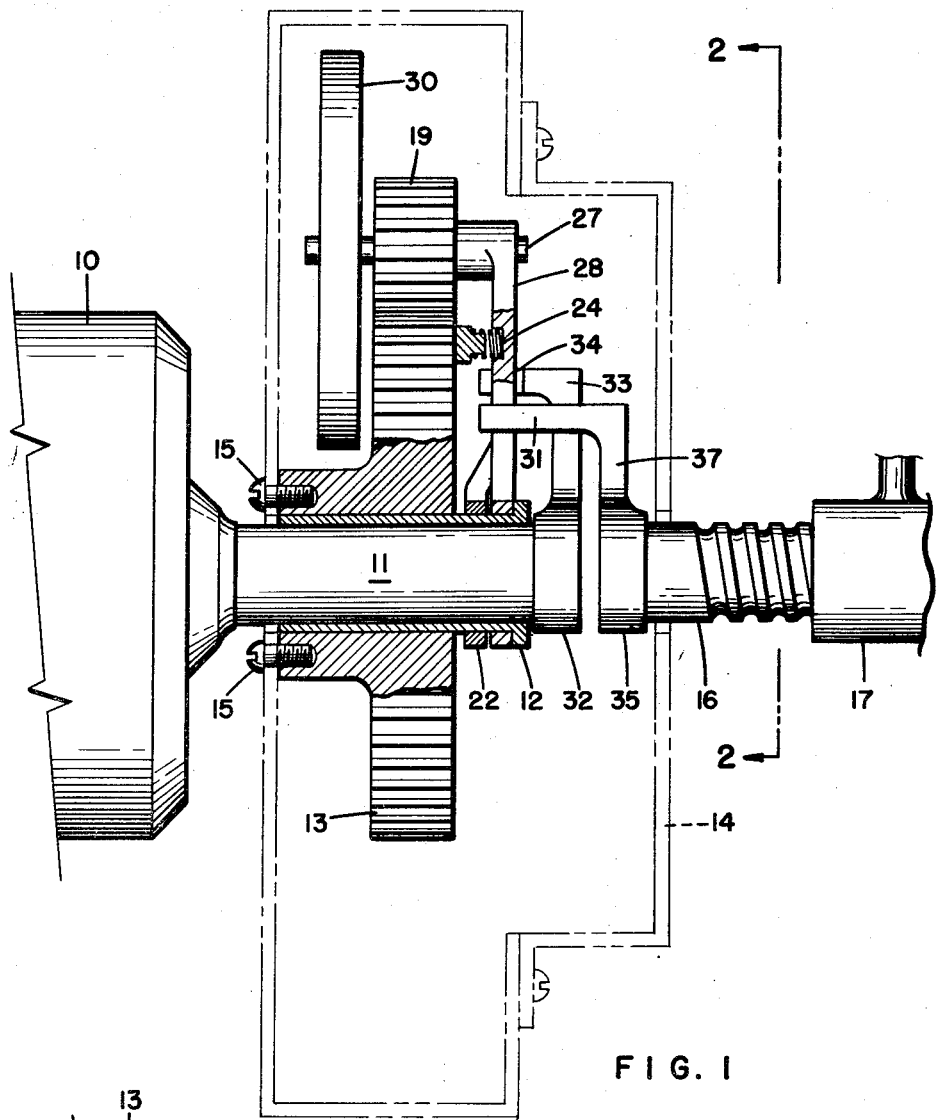

Referring to the drawings, 10 represents an electric motor having a shaft driven thereby and hereinafter referred to as driving shaft or driving element 11.

This shaft extends through a central bushing 12 of a stationary spur gear 13 mounted within a casing 14 where it is fixed by screws 15. Mounted for rotation coaxially with driving shaft 11, there is a driven shaft or element 16 extending outwardly from casing 14 and here shown in the form of a ball screw on which is operatively mounted a load-carrying nut 17. In practice, the driven element is supported within adequate bearings, not shown, and the entire clutch mechanism about to be described mounted within the completely closed casing 14.

Figure 7:
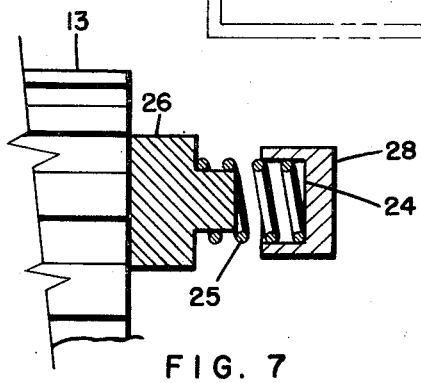
Figure 7 is an enlarged cross sectional view taken on line 7—7 in Figure 3.
Figure 2:
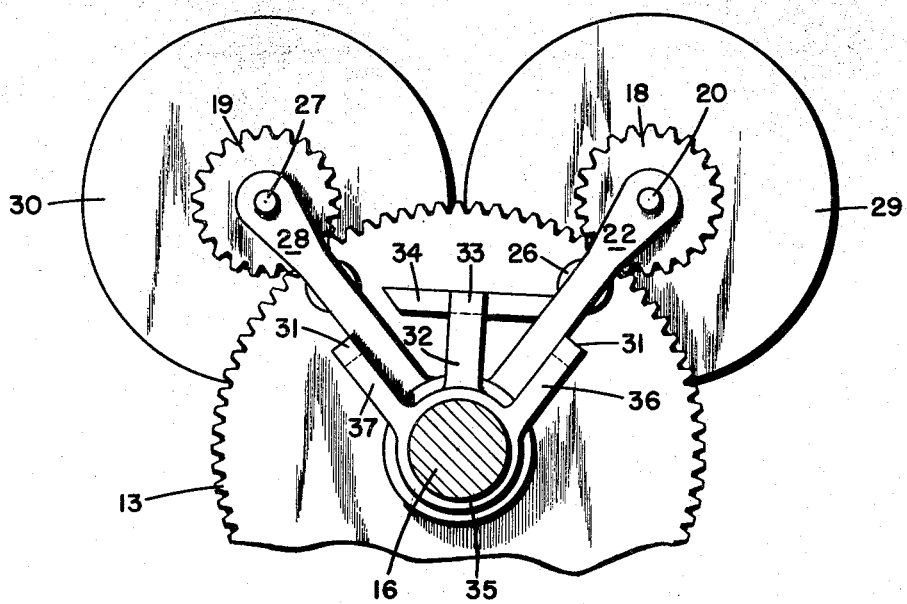
Figure 2 is a cross sectional view taken on line 2—2 in Figure 1 and looking in the direction of the arrows.
Figure 3:
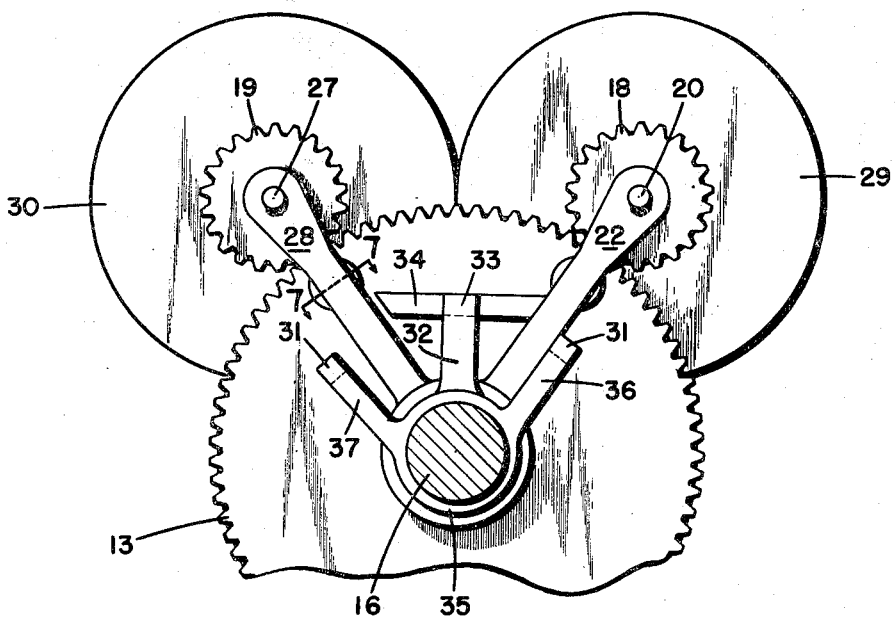
Figure 3 is a view similar to Figure 2, but showing some of the parts in a different position.

In mesh with gear 13, are two peripherally spaced pinions 18 and 19, the pinion 18 being operatively mounted on a stub arbor 20 carried by a radial or pinion arm 22 which has its end enlarged in an eye hole rotatably fitted on the end of bushing 12 protruding from gear 13. This arm extends radially adjacent to the face of gear 13, and intermediate its ends is provided with a shallow socket 24 in which is fitted one end of a short compression spring 25 which has a friction pad 26 carried by its outer end in frictional engagement with the face of gear 13, as clearly shown in Figure 7. The pinion 19 is operatively mounted on a stub arbor 27 carried by the outer end of a radial or pinion arm 28 corresponding to the radial arm 22, and has its inner end enlarged in an eye hole rotatably fitted on bushing 12 beside arm 22. Intermediate its ends, it also carries the friction pad 26 in frictional engagement with the face of gear 13. On arbor 20 is also mounted for rotation with pinion 18 a relatively large friction disk or wheel 29 which under certain conditions of operation is frictionally engageable with a similar disk 30 mounted on arbor 27 for rotation with pinion 19. These two disks are preferably made of somewhat resilient material such as hard rubber or the like, or they may be made of metal and lined with material such brake shoe lining or the like. As shown in Figure 2, it will be understood that the arms 22 and 28 extend radially from bushing 12 or shaft 11, and define between them an angle sufficiently large to normally prevent interengagement of the disks 29 and 30.

An L-shaped driving arm 32 is fixed on the end of the driving shaft 11 for rotation therewith and has its shorter portion 33 turned inwardly between pinion arms 22 and 28 where it is formed with a cross section 34 with sides substantially parallel to the pinion arms and capable of driving engagement therewith.

A power transfer member 35 is fixed on the inner end of driven shaft 16 for rotation therewith. This member is provided with two L-shaped fingers 36 and 37 having section 31 extending inwardly outside of the pinion arms 22 and 28 for engagement therewith.

Figure 4:
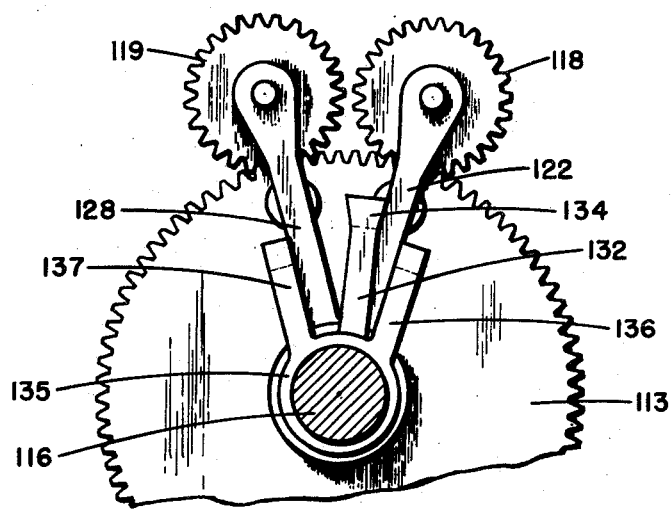
Figures 4 and 5 are views similar to Figures 2 and 3 illustrating a modified construction.
Figure 5:
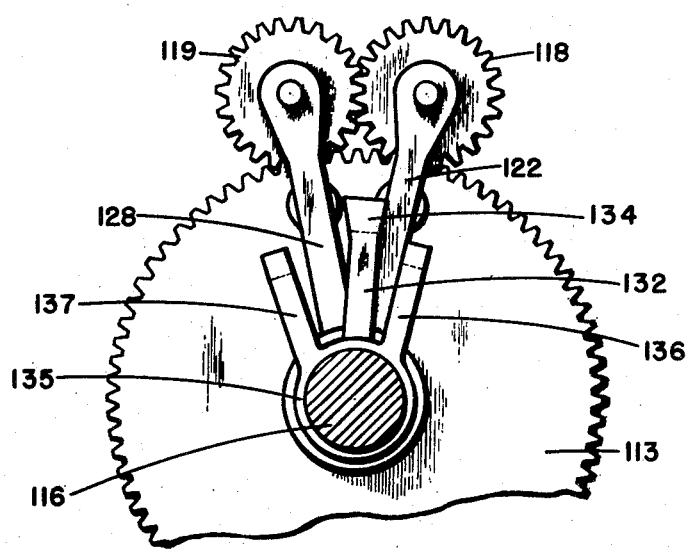
Figure 6:
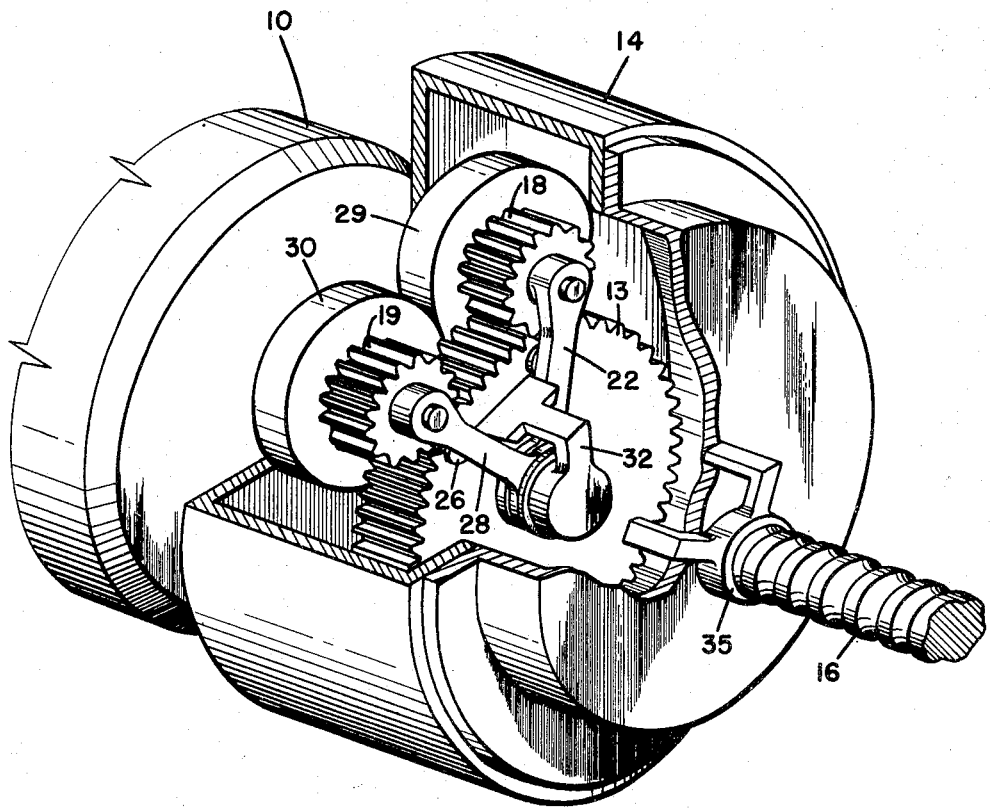
Figure 6 is a pictorial view of the clutch mechanism shown in Figure 1 with the casing broken away and the driven element shown spaced axially from the driving element to show details of construction.

In the modified construction shown in Figures 4 and 5, the device is substantially as above explained, except that the disks 29 and 30 have been eliminated and the pinions 118 and 119 are mounted closer together for interengagement under certain conditions of operation. The pinion arms 122 and 128 also have between them for engagement therewith a driving arm 132 formed with the cross section 134 and on their outer sides the pinion arms are also engageable by the fingers 136 and 137 of a power transfer member 135 fixed on the end of the driven element 116.

In the operation of the device shown in Figures 1, 2, 3 and 6, rotation of the driving shaft 11, imparted thereto by motor 10, is transmitted to either pinion arms 22 or 28 by the driving arm 32. If it is assumed that the rotation is in a clockwise direction in Figure 2 it will be understood that as the driving arm 32 rotates to the right, its cross arm 34 engages inside of pinion arm 22 to transmit rotation thereto and impart rotation to pinion 18 and disk 29 on arbor 20 by virtue of the operative engagement of the pinion with gear 13.

As the pinion arm 22 moves to the right, it also engages section 31 of finger 36 of the power transfer member 35 to impart rotation thereto which in turn is transmitted to the pinion arm 28 by section 31 of finger 37 to cause rotation of pinion 19 and disk 30. As clearly shown in Figure 2, the space between fingers 36 and 37 of the power transfer member 35 is sufficient to contact the pinion arms 22 and 28 respectively without effecting interengagement of the disks 29 and 30. As the pinion arm 28 is driven by the finger 37, it is prevented from moving ahead of the finger 37 by virtue of the frictional engagement of the friction pad 26 with the front face of stationary gear 13, thereby causing pinion 19 and disk 30 to trail pinion 18 and disk 29.

As so far explained, the clutch is simply transmitting rotation from the driving element 11 to the driven one 16 in the same direction and at the same rate of speed, thereby causing nut 17 to perform the work by moving axially on the screw 16 in one direction. In many applications, the work thus performed by the nut, especially when the unit is used as a compression or tension unit, results in a reacting load which, when the driving power such as motor 10 is turned off, is capable of imparting sufficient torque to the screw 16 to overcome the inertia of the motor. This condition especially exists in ball screw and nut structures wherein minimum friction takes place between the screw and nut elements. If such devices were not equipped with a locking mechanism or no-back device, the reacting force acting on the nut 17 would cause rotation of screw 16 and motor 10 in a counter-clockwise direction and effect axial movement of the nut in a direction reversed to that of its drive by motor 10. In other words, without a locking mechanism incorporated in the unit, this reacting force would cause the backing up of the nut 17 on the screw 16 and the consequential loss of the work heretofore performed by the nut. In the present construction, upon the initial return or backing up motion of the screw 16, finger 36 of the power transfer member 35 will drive pinion arm 22 in a counter-clockwise direction in Figure 2 while the finger 37 of the same member moves away from pinion arm 28 which remains stationary by virtue of the frictional engagement of its pad 26 with stationary gear 13. Movement of pinion arm 22 toward pinion arm 28 will cause rotation of pinion 18 and disk 29 in a counter-clockwise direction and cause the disk to jam against stationary disk 30 and lock the screw 16 against further reverse rotation resulting from the reacting load on the nut 17. As long as the screw or driven element 16 is subjected to this torque, that is, to a torque resulting from the reacting load on nut 17, the screw by frictional engagement of the disks 29 and 30 will be locked against rotation relative to the driving shaft 16. When it is again desired to drive the screw 16 in either direction through the motor 10, the cross section 34 of driving arm 32 will once more engage one or the other pinion arms 22 or 28 for transmitting rotation to the screw 16 in the manner above described.

In certain applications of the device, it is also possible for the load carried by the nut 17, while driven by the motor 10, to become an aiding load tending to turn the screw or driven element 16 ahead or faster than the motor. In such instance, and assuming that the overrunning torque is also in a clockwise direction in Figures 2 and 3, it will be understood that the finger 36 of the power transfer member 35 will move ahead of the pinion arm 22, the latter remaining in contact with cross section 34 of driving arm 32 by virtue of the frictional engagement of its pad 26 with gear 13. Concurrently, the finger 37 of the same member 35 will drive pinion arm 28 clockwise, causing interengagement of the disks 29 and 30 and a resulting braking action, preventing the driven member 16 from running ahead of or at a faster speed than the normal speed of the driving member.

In addition to the locking device resulting from the frictional interengagement of the disks 29 and 30, an important feature of this invention lies in the inherent ability of the somewhat resilient disks to gradually absorb the energy developed by the backing up motion of the driven element as well as efficiently dissipate the resulting heat.

In the modified construction shown in Figures 4 and 5, rotation of the driving element is transmitted to the driving arm 132 and therefrom to the pinion arm 122. From pinion arm 122, rotation is transmitted to driven element 116 through finger 136 of power transfer member 135 and to pinion arm 128 from finger 137. In this construction, backing up motion of the driven element 116 will cause finger 136 of power transfer unit 135 to impart rotation to pinion arm 122 in a counter-clockwise direction in Figure 4, causing pinion 118 to rotate into locking engagement with pinion 119 as clearly shown in Figure 5, thereafter preventing further backing up motion of the driven element 116. In case of an aiding load tending to turn the screw or driven element 116 ahead or faster than the motor, the finger 137 of the power transfer member 135 will drive pinion arm 128 clockwise, causing interengagement of the pinions 119 and 118 and a resulting locking action preventing the driven element 116 from running ahead of or at a faster speed than the driven element or motor shaft 11.

When it is desired to again drive the element 116 in either direction, driving arm 132 will engage either of the pinion arms 122 or 128 for imparting rotation thereto in one or the other direction and therefrom to the driven member through one or the other arm of the power transfer member 135.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In combination with a power actuated rotatable driving element and a coaxially driven element adapted to be rotated thereby in one direction but under certain conditions of operation and when power is shut off from said driving element being subjected to forces causing it to rotate in a reverse direction; the improvement consisting of a stationary gear coaxial with said elements, a duality of pinions in mesh with said gear, pinion arms rotatable about the center axis of said elements in supporting relationship with said pinions, means fixed on said driving element transmitting rotation to one of said arms and its pinion about said center axis, a power transfer member fixed on said driven element engageable with said one arm for transmitting rotation therebetween and engageable with the other of said arms for transmitting rotation thereto and its pinion about said center axis normally with a fixed space between said pinions, friction means between said arms and gear preventing free rotation movement therebetween, said member upon the initial reverse rotation aforesaid of said driven element transmitting reverse rotation of said one arm toward the other, and means on said pinions interengageable upon initial reverse rotation of said one arm for automatically locking said driven element against further reverse rotation.

2. In combination with a power actuated rotatable driving element and a coaxially driven element adapted to be rotated thereby in one direction but under certain conditions of operation and when power is shut off from said driving element being subjected to forces causing it to rotate in a reverse direction; the improvement consisting of a stationary gear coaxial with said elements, a duality of pinions in mesh with said gear, pinion arms rotatable about the center axis of said elements in supporting relationship with said pinions, means fixed on said driving element transmitting rotation to one of said arms and its pinion about said center axis, a power transfer member fixed on said driven element, a pair of fingers on said member one engageable by said one arm for transmitting rotation therefrom to said driven element and the other finger engageable with said other arm for transmitting rotation thereto and its pinion about said center axis, said fingers being spaced to normally maintain said arms in pinion non-interengaging position, friction means between said arms and gear preventing free relative movement therebetween, said one finger upon the initial reverse rotation aforesaid of said driven element transmitting reverse rotation to said one arm toward the other, and means on said pinions interengageable upon initial reverse rotation of said one arm for automatically locking said driven element against further reverse rotation.

3. In combination with a power actuated rotatable driving element and a coaxially driven element adapted to be rotated thereby in one direction but under certain conditions of operation and when power is shut off from said driving element being subjected to forces causing it to rotate in a reverse direction; the improvement consisting of a stationary gear coaxial with said elements, a duality of pinions in mesh with said gear, pivotally mounted pinion arms in supporting relationship with said pinions, friction means between said arms and gear preventing free relative movement therebetween, means fixed on said driving element between said arms for transmitting rotation to one of them and its pinion about the center axis of said elements, a power transfer member fixed on said driven element engageable with one of said arms for transmitting rotation therefrom to said driven element and with the other arm for transmitting rotation thereto and its pinion about said center axis, said member upon the initial reverse rotation aforesaid of said driven element transmitting reverse rotation to said one arm toward the other, and means on said pinions interengageable upon initial reverse rotation of said one arm for automatically locking said driven element against further reverse rotation.

4. In combination with a power actuated rotatable driving element and a coaxially driven element adapted to be rotated thereby in one direction but under certain conditions of operation being subjected to forces causing it to rotate in a reverse direction; the improvement consisting of a stationary circular member, a pair of pivotally mounted arms extending radially of said member, friction means between said arms and member preventing free relative movement therebetween, means fixed on said driving element between said arms for transmitting rotation to one of them about the center axis of said elements, a power transfer member fixed on said driven element engageable with one of said arms for transmitting rotation therefrom to said driven element and with the other arm for transmitting rotation thereto about said center axis, said power transfer member upon the initial reverse rotation aforesaid of said driven element transmitting reverse rotation to said one arm toward the other, and means on said arms cooperating with each other and with said stationary circular member upon initial reverse rotation of said one arm for automatically locking said driven element against further reverse rotation.

5. A device of the character described comprising rotatable driving and driven elements, a stationary gear, a pair of pinions in mesh with said gear, first and second pinion supporting arms rotatable with said pinions about the axis of said gear, means fixed on said driving element transmitting rotation to said first arm and its pinion, a power transfer member fixed on said driven element engageable by said first arm for transmitting rotation therebetween and engagable with said second arm for transmitting rotation thereto and its pinion in trailing relationship with said first arm and pinion, means between said arms and gear preventing free relative movement therebetween, said driven element under certain conditions of operation being subjected to reacting forces causing it to rotate in a direction reversed to that of its drive by said driving element, said member upon the initial reverse rotation of said driven element transmitting said reverse rotation to said first arm toward the second arm, and means on said pinions interengageable upon initial reverse rotation of said first arm to automatically lock said driven element against further reverse rotation.

6. A device of the character described comprising rotatable driving and driven elements, power means imparting rotation to said driving element, a stationary gear, a pair of pinions in mesh with said gear, first and second pinion supporting arms rotatable with said pinions about the axis of said gear, means fixed on said driving element transmitting rotation to said first arm and its pinion, a power transfer member fixed on said driven element engageable by said first arm for transmitting rotation therebetween and engageable with said second arm for transmitting rotation thereto and its pinion in trailing relationship with said first arm and pinion, means between said arms and gear preventing free relative movement therebetween, said driven element under certain conditions of operation being subjected to aiding loads causing its rotary speed to increase over its normal rotary speed from said driving element, said member transmitting the initial increased rotary speed of said driven element to said second arm toward said first one, and means on said pinions interengageable upon initial increased rotary speed of said second arm to automatically prevent said driven element to further rotate at such increased speed.

7. A device of the character described comprising rotatable driving and driven elements, power means imparting rotation to said driving element, first and second arms rotatable about the axis of said driving element, means fixed on said driving element transmitting rotation to said first arm, a power transfer member fixed on said driven member engageable by said first arm for transmitting rotation therebetween and engageable with said second arm for transmitting rotation thereto in trailing relationship with said first arm, said driven element under certain conditions of operation being subjected to aiding loads causing its rotary speed to increase over its normal rotary speed from said driving element, said member transmitting the initial increased rotary speed of said driven element to said second arm toward said first one, and means on said arms interengageable upon initial increased rotary speed of said second arm to automatically prevent said driven element to further rotate at such increased speed.

References Cited in the file of this patent

UNITED STATES PATENTS

| Number | Name | Date |
|---|---|---|
| 770,087 | Mocomble | Sept. 13, 1904 |
| 2,402,073 | Newell | June 11, 1946 |
| 2,420,555 | Mott | May 13, 1947 |
| 2,514,465 | Bergsma | July 11, 1950 |